US012129207B2

(12) United States Patent
Pal et al.

(10) Patent No.: US 12,129,207 B2
(45) Date of Patent: Oct. 29, 2024

(54) METHOD OF MANUFACTURING CONCRETE PRODUCTS WITH ADDITIVES

(71) Applicant: CARBICRETE INC., Montreal (CA)

(72) Inventors: Shrinwantu Pal, Calgary (CA); Jennifer Martin Del Campo, Montréal (CA); Mehrdad Mahoutian, Montréal (CA); Sanoop Kumar, Laval (CA); Dulani Kodippili, Lachine (CA)

(73) Assignee: CARBICRETE INC., Montreal (CA)

( * ) Notice: Subject to any disclaimer, the term of this patent is extended or adjusted under 35 U.S.C. 154(b) by 0 days.

(21) Appl. No.: 18/592,622

(22) Filed: Mar. 1, 2024

(65) Prior Publication Data

US 2024/0294432 A1 Sep. 5, 2024

Related U.S. Application Data (60) Provisional application No. 63/487,972, filed on Mar. 2, 2023.

(51) Int. Cl.
*B28B 1/14* (2006.01)
*B28B 1/54* (2006.01)
(Continued)

(52) U.S. Cl.
CPC ............ *C04B 28/08* (2013.01); *B28B 11/245* (2013.01); *C04B 14/28* (2013.01);
(Continued)

(58) Field of Classification Search
CPC ........... B28B 1/14; B28B 1/54; B28B 11/245; B29B 13/10; C04B 7/14; C04B 14/28;
(Continued)

(56) References Cited

U.S. PATENT DOCUMENTS

2017/0073270 A1* 3/2017 Shao ..................... B28B 11/245
2021/0206696 A1 7/2021 Mahoutian

FOREIGN PATENT DOCUMENTS

CN 110482972 A 11/2019
CN 114315251 A 4/2022
(Continued)

OTHER PUBLICATIONS

Translation of KR 20100011712 A (published on Feb. 3, 2010).*
(Continued)

*Primary Examiner* — Leo B Tentoni
(74) *Attorney, Agent, or Firm* — CANTOR COLBURN LLP (57) ABSTRACT

There is provided a method of manufacturing a concrete product. A composition including a slag-based binder, an aggregate, water and an additive selected from the group consisting of calcium chloride, ground eggshells, sodium carbonate, sodium bicarbonate, sodium hydroxide, fine calcium carbonate, calcium oxide, borax, ammonium chloride and combinations thereof, is mixed to obtain a concrete mixture. The concrete mixture is formed into a desired shape to obtain a formed concrete, the formed concrete having a first water-to-binder ratio. The formed concrete is dried to obtain a dried concrete having a second water-to-binder ratio less than the first water-to-binder ratio. The concrete mixture is carbon cured to obtain the concrete product.

20 Claims, 5 Drawing Sheets

(51) Int. Cl.

| | | |
|---|---|---|
| *B28B 11/24* | (2006.01) | |
| *C04B 7/14* | (2006.01) | |
| *C04B 14/28* | (2006.01) | |
| *C04B 14/30* | (2006.01) | |
| *C04B 14/36* | (2006.01) | |
| *C04B 22/00* | (2006.01) | |
| *C04B 22/06* | (2006.01) | |
| *C04B 22/10* | (2006.01) | |
| *C04B 22/12* | (2006.01) | |
| *C04B 28/08* | (2006.01) | |
| *C04B 28/14* | (2006.01) | |
| *C04B 40/02* | (2006.01) | |
| *C04B 111/00* | (2006.01) | |
| *C04B 111/56* | (2006.01) | |
| *C04B 111/60* | (2006.01) | |

(52) U.S. Cl.
CPC ........ *C04B 22/0013* (2013.01); *C04B 22/064* (2013.01); *C04B 22/106* (2013.01); *C04B 22/124* (2013.01); *C04B 28/14* (2013.01); *C04B 40/0231* (2013.01); *C04B 2111/0075* (2013.01); *C04B 2111/56* (2013.01); *C04B 2111/60* (2013.01)

(58) Field of Classification Search
CPC ......... C04B 14/30; C04B 14/36; C04B 28/08; C04B 40/0231
USPC .......... 264/82, 140, 234, 333, 334; 106/714, 106/789
See application file for complete search history.

(56) References Cited

FOREIGN PATENT DOCUMENTS

| GB | 1599916 A | * | 10/1981 | ............ C04B 40/065 |
| KR | 20100011712 A | * | 2/2010 | ......... C04B 40/0039 |
| WO | WO-9717131 A1 | * | 5/1997 | ............ B28B 11/245 |
| WO | 2015044381 A1 | | 4/2015 | |
| WO | WO-2019025699 A1 | * | 2/2019 | ............. B28B 23/06 |
| WO | WO-2020206540 A1 | * | 10/2020 | ............ B28B 11/245 |
| WO | WO-2020206541 A1 | * | 10/2020 | ............ B28B 11/245 |

OTHER PUBLICATIONS

Translation of WO 9717131 A1 (published on May 15, 1997).*
Translation of WO 2019025699 A1 (published on Feb. 7, 2019).*
International Search Report for corresponding application for corresponding application PCT/CA2024/050256 filed Mar. 1, 2024; Mail date May 1, 2024.
Qifeng Song, "Use of Steel Slag as Sustainable Construction materials: A review of Accelerated Carbonation Treatment", Resources, Conservation & Recycling 173 (2021).
Written Opinion for corresponding application for corresponding application PCT/CA2024/050256 filed Mar. 1, 2024; Mail date May 1, 2024.

* cited by examiner

METHOD OF MANUFACTURING CONCRETE PRODUCTS WITH ADDITIVES

CROSS-REFERENCE TO RELATED APPLICATIONS

This disclosure claims priority from U.S. patent application No. 63/487,972 filed on Mar. 2, 2023, which is incorporated herein by reference in its entirety.

TECHNICAL FIELD

This disclosure generally relates to concrete products and, more particularly, to the manufacturing of concrete products using a slag binder.

BACKGROUND

Conventionally, the manufacture of carbonated steel slag concrete products involves dry-mixing binder materials such as steel slag with aggregates and water. The resultant mixture is generally subjected to a conditioning step and then undergoes a curing step, during which carbonation of reactive alkaline materials in the mixture results in the fortification of the concrete produced. Improvements remain desired, particularly in the $CO_2$ capture efficiency during curing of the concrete products.

SUMMARY

In one aspect, there is provided a method of manufacturing a concrete product, the method including mixing a composition including a slag-based binder, an aggregate, water and an additive selected from the group consisting of calcium chloride, ground eggshells, sodium carbonate, sodium bicarbonate, sodium hydroxide, fine calcium carbonate, calcium oxide, borax, ammonium chloride and combinations thereof, to obtain a concrete mixture; forming the concrete mixture into a desired shape to obtain a formed concrete, the formed concrete having a first water-to-binder ratio; drying the formed concrete to obtain a dried concrete having a second water-to-binder ratio less than the first water-to-binder ratio; and carbon curing the concrete mixture to obtain the concrete product.

In another aspect, there is provided a method of manufacturing a concrete product, comprising: mixing a composition including a slag-based binder, an aggregate, water and an additive selected from the group consisting of calcium chloride, ground eggshells, sodium carbonate, sodium bicarbonate, sodium hydroxide, fine calcium carbonate, calcium oxide, borax, ammonium chloride and combinations thereof, to obtain a concrete mixture; molding the concrete mixture into a desired shape; demolding the concrete mixture to form a molded intermediate having a first water-to-binder ratio; drying the molded intermediate to obtain a dried concrete having a second water-to-binder ratio less than the first water-to-binder ratio; and carbon curing the concrete mixture to obtain the concrete product.

The methods as defined above and described herein may further include one or more of the following features or steps, in whole or in part, and in any combination.

In some embodiments, the drying step and the carbon curing step are performed at least partially at the same time (e.g., overlapping in time or occurring simultaneously).

In some embodiments, the additive is provided in solid or soluble form.

In some embodiments, the soluble form of the additive is dissolved in the water.

In some embodiments, the additive is present in a concentration of from 0.25 to 5 M in the water.

In some embodiments, the additive is added in a concentration of 0.3 to 5% by weight with respect to the total weight of the composition.

In some embodiments, the additive is selected from the group consisting of ground calcium carbonate, ammonium chloride, calcium oxide, borax and combinations thereof.

In some embodiments, the additive is selected from (i) the combination of borax and calcium carbonate, or (ii) the combination of borax and ammonium chloride.

In some embodiments, the forming comprises molding the concrete mixture.

In some embodiments, the method further comprises demolding the formed concrete.

In some embodiments, the demolding step overlaps or is simultaneous with the drying.

In some embodiments, the forming comprises dry casting the concrete mixture in a mold to obtain a molded concrete.

In some embodiments, the concrete mixture has a slump zero or close to zero.

In some embodiments, the first water-to-binder ratio is reduced by up to 90% to obtain the second water-to-binder ratio.

In some embodiments, the curing is performed with $CO_2$ gas at a concentration of at least 5% by volume and at a pressure of 0.1-50 psi for 1-72 hours.

In some embodiments, the method further comprises before the step of mixing, grinding the additive with the slag binder.

In some embodiments, the concrete mixture that is subjected to the curing step has an alkaline pH.

In some embodiments, the pH is more than 8.

In some embodiments, the slag binder comprises a slag selected from a steel slag, a stainless-steel slag, a basic oxygen converter sludge, a blast furnace sludge, a slag by-product of zinc production, a slag by-product of iron production, and/or a slag by-product of copper production.

In some embodiments, the aggregate is a natural or lightweight aggregate.

In some embodiments, the concrete product is selected from a pipes, a traffic barrier, a wall, a box, a culvert, a tiles, a paver, a foundation, a slab, a step, a curb, a concrete masonry unit, a beam, a floor, a retaining wall, a column, a manhole, a sewage pipes, or a railroad tie.

Many further features and combinations thereof concerning the present improvements will appear to those skilled in the art following a reading of the instant disclosure.

DETAILED DESCRIPTION

The production of cement and the formation of cement-based concrete is one of the major contributors to carbon dioxide emissions globally. It is therefore desirable to reduce the environmental footprint associated with cement production processes. One way to reduce this carbon footprint is with carbonation curing technology. This technology involves a reaction of carbon dioxide with the oxides and/or hydroxides of calcium and/or magnesium present in raw materials in the precast concrete under moist conditions, leading to the fortification of the concrete.

One of the factors responsible for imparting strength in the finished carbonated precast concrete is the degree of carbonation by which the formation of carbonates of calcium and/or magnesium cross-link and envelope binder particles. The degree of carbonation may be influenced by varying physical curing conditions such as temperature, pressure, or relative humidity employed in the curing process; however, these parameters are often difficult to control in a production-scale setting. It was presently found that another way to impact the degree of carbonation is with the addition of an additive which can modulate the carbonation reaction by impacting the kinetics, thermodynamics, and/or pH during the carbonation process.

Traditional additives used in the concrete industry provide the role of facilitating the dry casting process. These traditional additives for example are (i) water-repellants additives that provide integral water resistance to concrete, (ii) air entrainment additives that increase the porosity of the dry mix, or (iii) plasticizers that allow better workability throughout the molding and demolding process. These traditional additives have been developed within the cement concrete industry and therefore have been carefully considered to not impact the hydration reaction which is the mechanism responsible for the fortification of the concrete products. For carbonated slag concrete (particularly steel slag), some additives can negatively impact the carbonation reaction, resulting in lower performance and material properties of the final products. Often, a combination of conventional additives leads to detrimental outcomes in performance.

It was presently found that an additive selected from the group consisting of calcium chloride, ground eggshells, sodium carbonate, sodium bicarbonate, sodium hydroxide, fine calcium carbonate, calcium oxide, borax, ammonium chloride and combinations thereof, can be added to a concrete mixture containing a slag binder to improve the $CO_2$ capture and/or the strength of the obtained concrete products. In preferred embodiments, both the $CO_2$ capture and the strength are improved by the addition of the additive. In preferred embodiments, the bulk density of the additive(s) is at least 1000 kg/m$^3$.

Ground eggshells having a small size and fine calcium carbonate (as opposed to larger or coarse calcium carbonate) improve the $CO_2$ capture and/or the strength of the obtained concrete products. This is because the precipitation of new $CaCO_3$ generated via carbonation onto the $CaCO_3$ additive provided in the sample is directly proportional to the available surface area of supplied $CaCO_3$. This is referred to as seeding. With grinding, the surface area of particulates increases exponentially in the surface area domain. In the case of finely ground $CaCO_3$ additive, regardless of the origin of said additive (e.g., eggshells, natural or synthetic $CaCO_3$), more available surface area results in effective cross-linking of the $CaCO_3$ matrix generated via carbonation, which results in improvement. The manifestation of effective seeding and matrix formation is not observed for the coarse $CaCO_3$ additive. In some embodiments, the fine calcium carbonate and/or the ground eggshells have a specific surface area (or fineness or Blaine) of more than 50 m$^2$/kg (whereas in contrast, course calcium carbonate particles may have a specific surface area of less than 50 m$^2$/kg). In some embodiments, the fine calcium carbonate particles have a D50 of less than 300 microns (μm), less than 200 μm, less than 100 μm, less than 50 μm, less than 25 μm, less than 10 μm, less than 1 μm or less than 0.1 μm. For reference, a D50 of 300 μm means that 50% of the particles are smaller than 300 microns in size.

The term "slag binder" or "slag-based binder" generally refers to a binder containing a slag. The slag binder can comprise at least 10%, at least 25%, at least 30%, at least 40%, at least 50%, at least 60%, at least 70%, at least 80%, at least 90% or at least 95% of slags. The percentages expressed herein are weight percentages. In some embodiments, the binder consists of slags. Put differently, the binder may be devoid of cement. The slag binders of the present disclosure preferably exclude ordinary Portland cement. Moreover, in some embodiments, the concrete excludes ordinary Portland cement. In some embodiments the slag binder can include other materials with poor or no hydraulic activity. Examples of materials that have poor or no hydraulic activity include fly ash, calcinated shale, silica fume, zeolite, ground granulated blast furnace slag, non-hydraulic cement and limestone powder. In some embodiments, the slag binder contains at least 25% by weight of materials with poor or no hydraulic activity, preferably at least 50% by weight, more preferably at least 75% by weight, even more preferably more than 90% by weight.

In the context of the present disclosure, the expressions "cement" and "binder" have different meanings. A binder is a material that, when mixed with water will cause hardening of the mixture to obtain a concrete product. A cement is a specific type of binder. For instance, binders include Ordinary Portland Cement, steel slag, stainless steel slag, and so on. Cements include Ordinary Portland Cement, and other kinds of cement. Slags are binders, but they are not considered cement.

Examples of slags include but are not limited to steel slag, stainless-steel slag, basic oxygen converter sludge, blast furnace sludge, by-product of zinc production, by-product of iron production, and by-product of copper production. The steel slag may include one or more of a reduced steel slag, an oxidized steel slag, a converter steel slag, an electrical arc furnace slag, a basic oxygen furnace slag, a ladle slag, a fast-cooled steel slag, and a slow-cooled steel slag.

In one embodiment, the steel slag used herein has a cumulative calcium silicate content (ex: $CS+C_2S+C_3S$ phase concentration) of at least about 15% by weight. In one embodiment, the steel slag used herein has a cumulative calcium silicate content (ex: $CS+C_2S+C_3S$ phase concentration) of at least about 20% by weight. In one embodiment, the steel slag used herein has a cumulative calcium silicate content (ex: $CS+C_2S+C_3S$ phase concentration) of at least about 30% by weight. In one embodiment, the steel slag used herein has a cumulative calcium silicate content (ex: $CS+C_2S+C_3S$ phase concentration) of at least about 40% by weight. In one embodiment, the steel slag used herein has a $SiO_2$ content of at least about 6% or more preferably at least about 15% by weight.

The steel slag may include a mixture of coarse slag pieces and fine slag pieces. Coarse slag pieces may have a Blaine fineness of less than about 50 $m^2/kg$ and fine slag pieces may have a Blaine fineness greater than about 50 $m^2/kg$. The coarse slag pieces, the fine slag pieces, or both may be land-filled as an outcome from typical steel making process. Received steel slag originating from waste (such as landfill and/or industrial waste) may optionally be refined. Refining the steel slag may include filtering the received steel slag to separate fine slag pieces from coarse slag pieces. Alternatively, or additionally, refining the received steel slag may also include pulverizing the steel slag to a fine powder. In some exemplary embodiments, the filtered fine pieces are pulverized while coarser pieces are not pulverized. For example, for electric arc furnace (EAF) steel slag, the slag may be pulverized to a Blaine fineness of at least 50 $m^2/kg$, and preferably about 180 $m^2/kg$ (+10). For example, for EBH steel slag (mix of EAF and basic oxygen furnace (BOF) and ladle slag), the slag may be pulverized to a Blaine fineness of at least 100 $m^2/kg$ and preferably about 240 $m^2/kg$. In other exemplary embodiments, the steel slag may be pulverized to a finer size. In another example, at least fifty percent of ground slag may be smaller than 100 microns, and at least ten percent of ground slag may be smaller than 50 microns, i.e., D(50)<100 microns, and D(10)<50 microns. In preferred embodiments, the steel slag for the slag-based binder or the slag binder is defined as having a Blaine fineness below 100 $m^2/kg$. Steel slag can be present in the concrete mixture as an aggregate. The steel slag as an aggregate would still be reactive with carbon dioxide. Inert steel slag aggregates can be defined as having a Blaine fineness below 10 $m^2/kg$ and reactive aggregates can be defined as having a Blaine fineness of 10-100 $m^2/kg$.

In some embodiments, the "steel slag" as used herein excludes iron slag and blast furnace slag that are typically generated during iron production and that may be used in making cement, such as pozzolanic slag.

Figure 1:
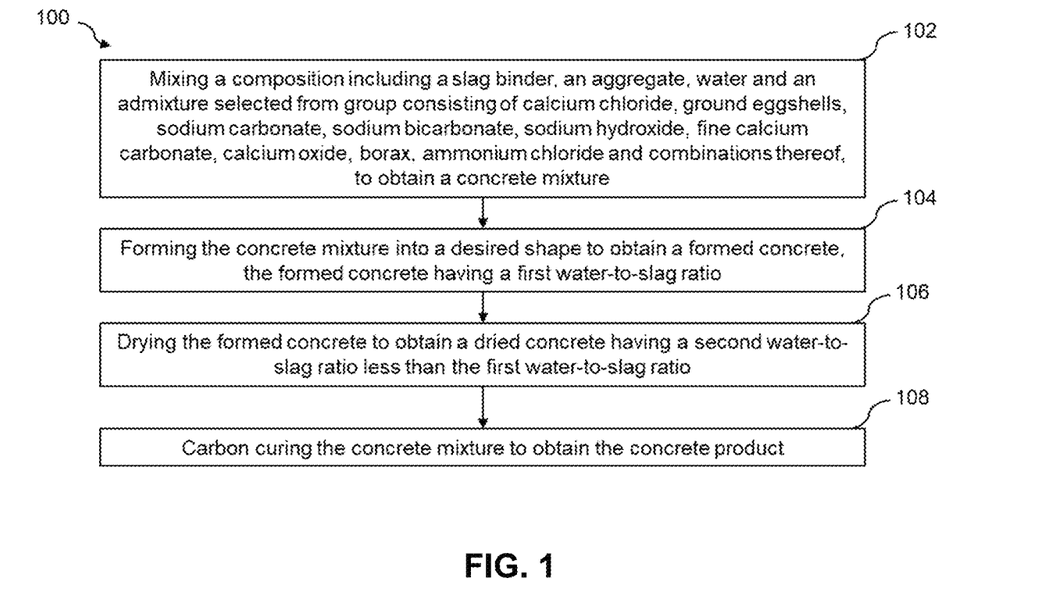
FIG. 1 is a flow chart illustrating a method for producing a concrete product according to an embodiment of the present disclosure.

Referring to FIG. 1, there is provided a method 100 of manufacturing a concrete product. In step 102, a composition is mixed to obtain a concrete mixture, the composition including a slag-based binder, an aggregate, water and an additive selected from group consisting of calcium chloride, ground eggshells, sodium carbonate, sodium bicarbonate, sodium hydroxide, fine calcium carbonate, calcium oxide, borax, ammonium chloride and combinations thereof, to obtain a concrete mixture. In some embodiments, the dry components of the composition are first mixed together. Depending on the nature of the additive, it can be added as either a solid or as a solution (i.e., a known amount pre-dissolved additive is present in the water involved in the preparation of the dry mix), or as a component of slag that has been ground together to allow better dispersion of solid. In some embodiments, the method includes different ways to add the additive to the composition, including but not limited to addition directly a) as a solid, b) as an aqueous solution or c) by segregating or dispersing the additive by grinding together with the binder (e.g., slag).

Preferably, the components are thoroughly mixed to achieve a mixture with suitable workability, but zero slump. There are many suitable ways to perform the mixing of the concrete mixture, for example with a mixing drum. In some embodiments, the slump is close to 0 such as less than 3 mm, less than 2 mm, less than 1 mm, less than 0.5 mm or less than 0.3 mm. A "zero-slump concrete" is defined as a concrete of stiff or extremely dry consistency showing no measurable slump after removal of the slump cone. A standard exemplary slump test is American Society for Testing and Materials (ASTM) 0143, for Hydraulic-Cement Concrete. A non-zero-slump concrete is a concrete that is not stiff nor extremely dry consistency showing a measurable slump after removal of the slump cone by a test such as ASTM 0143.

The term "aggregate" as used herein includes various types of aggregates suitable for the production of concrete, including natural or artificial, normal weight or lightweight aggregates that can be incorporated into the dry or wet concrete product as filler in the production of concrete products. Examples of lightweight aggregates include natural lightweight aggregates (e.g. pumice), expanded clay aggregates, expanded shale aggregates, and expanded iron slag aggregates. Other usable aggregates include: crushed stone, manufactured sand, gravel, sand, recycled aggregate, granite, limestone, quartz, chalk powder, marble powder, quartz sand, and artificial aggregate. These aggregates can be incorporated into the mixture as fine and/or coarse aggregates. Aggregate content can be as high as 90% of the weight of the composition.

In some embodiments, the composition contains the slag binder in a concentration of from 5 to 80 wt %, from 10 to 80 wt %, from 20 to 80 wt % from 30 to 80 wt %, from 5 to 70 wt %, from 5 to 60 wt %, from 5 to 50 wt %, from 10 to 70 wt % or from 20 to 60 wt %. In some embodiments, the slag binder is combined with another binder being a material with poor or no hydraulic activity. In such embodiments the concentration of total binder can be present in a concentration of from 5 to 80 wt %. In such embodiments, the slag binder can be present in a minimal concentration of at least 5 wt %, at least 10 wt % or at least 20 wt %.

In some embodiments, the composition contains the aggregates in a concentration of up to 90 wt %. In some cases, the aggregates can be considered the balance for the concentration ranges (i.e. to complete the composition to 100 wt %). In some embodiments, the aggregates are present in a concentration of from 6 to 90 wt %, from 10 to 90 wt %, from 20 to 90 wt %, from 30 to 90 wt %, from 40 to 90 wt %, from 6 to 85 wt %, from 6 to 80 wt %, from 10 to 80 wt %, from 20 to 70 wt %.

In some embodiments, the combined concentration of slag binder, optional binder with poor or no hydraulic activity, and aggregates is at least 80 wt %, at least 85 wt %, or at least 90 wt %.

In some embodiments, the additive is provided in a concentration of from 0.3 to 5 wt %, from 0.5 to 5 wt %, from 1 to 5 wt %, from 0.3 to 4 wt %, from 0.3 to 3 wt %, from 0.3 to 2 wt %, from 0.5 to 4 wt %, from 0.5 to 3 wt % or from 1 to 2 wt %. In some embodiments, the additive is provided in soluble form and is present in the water in a concentration of from 0.25 to 5 M, from 0.25 to 4 M, from 0.25 to 3 M, from 0.25 to 2 M, from 0.25 to 4 M, from 0.25 to 3 M, from 0.25 to 2 M, from 0.5 to 4 M, or from 0.5 to 3 M.

As explained above, the amount of water provided is such that the concrete is a zero slump or close to zero slump concrete. In some embodiments, the water concentration is 0.01 of binder weight or preferably 0.1 of binder content or preferably 0.2 of binder content or preferably 0.3 of binder content or preferably 0.4 of binder content. In some embodiments, the concentration of water is from 0.01 to 0.4 wt. %, from 0.1 to 0.4 wt. %, from 0.2 to 0.4 wt. %, or from 0.1 to 0.3 wt. %.

Optionally, the composition may comprise one or more of an accelerator, a retarder, a viscosity modifying agent, an air entertainer, a foaming agent, an alkali-silica reaction inhibitor, an anti-wash-out, a corrosion inhibitor, a shrinkage reducer, a concrete crack reducer, a plasticizer, a superplasticizer, a sealer, a paint, a coating, a water reducer, a water repellant, an efflorescence controller, a polymer powder, a polymer latex, and a workability retainer. In some embodiments, the composition also comprises one or more of cellulose fibers, glass fibers, micro synthetic fibers, natural fibers, polypropylene fibers, polyvinyl alcohol fibers, and steel fibers. These optional components can be provided in a concentration of up to 10 wt. %, up to 9 wt. %, up to 8 wt. %, up to 7 wt. %, up to 6 wt. %, up to 5 wt. %, up to 4 wt. %, or up to 3 wt. %.

At step 104, the concrete mixture is formed into a desired shape to obtain a formed concrete. The formed concrete has a first water-to-binder ratio. The water to binder ratio (evaluated by weight) can vary. In some embodiments, the concrete mixture is cast into a mold to form a molded intermediate with an appropriate geometric form that can be easily demolded without deformation. Subsequently, if molding was used in the forming step, the molded intermediate can be demolded before being subjected to drying.

In some embodiments, the step 104 of forming also includes consolidating the concrete mixture under compaction and vibration to provide a formed intermediate. In some embodiments, the imparting of the form may include transferring the freshly prepared concrete mixture by any appropriate means and casting in a prepared mold. The mold may be made of steel, iron, aluminum, plastic, fiber reinforced plastic (FRP) or another material. The mold may be pre-lubricated prior to casting in order to facilitate the demolding process. If using a wet mix, it may be consolidated within the mold by internal or external vibrators. In some cases, the consolidation step lasts no more than 120 seconds. Dry cast concrete may be compacted/pressed/pressurized/formed into the mold by compaction and or vibration. The forming may include casting the concrete mixture in a shape of a precast, a concrete pipe, a box culvert, a draining product, a paving slab, a floor slab, a traffic barrier, a wall manhole, a retaining wall, a paver, a tile, or a shingle.

In some embodiments, the method includes inserting a reinforcing material inside the mold before the casting of the concrete mixture. The inserting of the reinforcing material may include inserting bars made of the reinforcing material, where the reinforcing material includes one or more of carbon steel, stainless steel, and fiber reinforced polymer.

At step 106, the formed concrete is subjected to drying to a second water-to-binder ratio by weight lower than an initial or first water-to-binder ratio by weight. The drying can be performed by natural evaporation and/or with heating. Exemplary drying elements include but are not limited to drum heaters, floor heating mats, fans, heaters, blowers or fan heaters and can be used to accelerate the evaporation rate. The heating elements/wires or floor heating mats or drum heaters are installed so as to cover the exterior surfaces of the mold. The elements heat up the mold's walls and eventually increase the evaporation process to reduce the moisture content of the concrete. Fans, heaters, fan heaters and blowers, are best placed facing toward the slag-based intermediate free surface, which may be its upper surface.

In some embodiments, the drying step is performed until the first water-to-binder ratio is reduced by 90%, 80%, 70%, 60%, 50%, 40%, or 30% to reach the second water-to-binder ratio being smaller than the first water-to-binder ratio.

At step 108, the formed concrete is cured with $CO_2$ for a given time frame (e.g. 1-72 h) to achieve the target cured concrete product. The curing is performed under alkaline conditions, such as a pH of at least 8, at least 8.5, or at least 9.

The carbonation reaction is impacted by pH modulators. The pH modulators maintain an alkaline pH that can provide a thermodynamic advantage for the reaction of $CO_2$, precipitation enhancers which lead to increased precipitation of calcium carbonate in a final product, by calcium leaching agents that improve dissolution of calcium in the pore solution which in turn increases the total available calcium that can undergo reaction with $CO_2$. There are also structural modifiers which may alter the crystal structure of formed calcium carbonate to impart strength. The additives of the present disclosure were added to impact the carbonation reaction.

A variety of additives were tested (see Examples below) including sodium carbonate, sodium bicarbonate, sodium hydroxide, calcium hydroxide (both as a chemical grade purity additive, as well as when derived from slag slurry), natural calcium carbonate (limestone), synthetic calcium carbonate, egg shells (as a biomineral containing calcium carbonate), ethylene diamine tetraacetic acid (EDTA), calcium chloride, ammonium chloride, ammonium acetate, ethylene glycol, sodium chloride, borax, boric acid, citric acid, calcium oxide and commercial alum (potassium aluminum sulfate).

Sodium carbonate, sodium bicarbonate, sodium hydroxide, calcium hydroxide (both as a chemical grade purity additive, as well as when derived from slag slurry), and calcium oxide were tested as pH modulators designed to maintain alkaline pH during the carbonation process. Natural calcium carbonate (limestone), synthetic calcium carbonate, egg shells (as a biomineral containing calcium carbonate) were tested as precipitation enhancers. EDTA, calcium chloride, ammonium chloride, ammonium acetate, ethylene glycol, citric acid, and sodium chloride were tested as calcium leaching agents because they increase the availability of calcium ions by allowing the enhanced dissolution of calcium minerals present in the slag into the pore solution. Borax, boric acid, and commercial alum (potassium aluminum sulfate) were tested as structure modifiers to impact the structure of the final precipitated calcium carbonate and the formation of B-containing minerals, which are known to exhibit superior hardness when compared to calcite alone.

Figure 2:
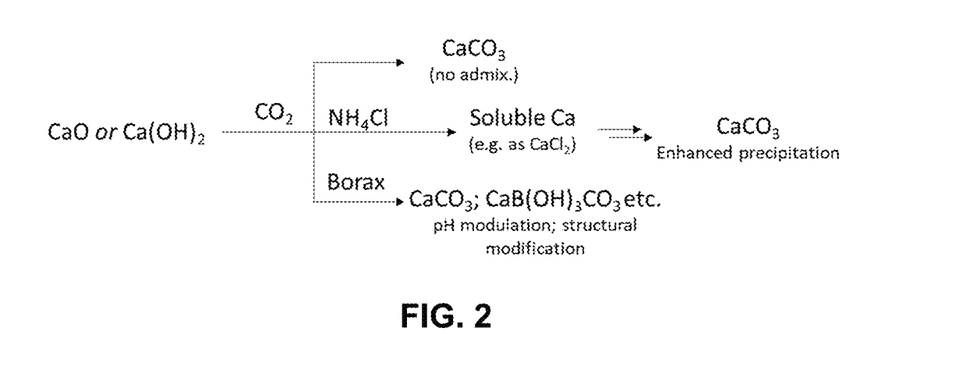
FIG. 2 is a schematic showing the carbonation mechanism without additive, with ammonium chloride additive or with borax additive.

Out of the twenty additives tested, it was surprisingly found that four preferred species, namely fine calcium carbonate, ammonium chloride, calcium oxide and borax dramatically improve the degree and/or rate of carbonation and/or performance of the $CO_2$ cured carbonated concrete products. As depicted in FIG. 2, the additives may be responsible for the enhancement of calcium leaching by the formation of soluble calcium, which are in turn responsible for enhanced precipitation. Additionally, the incorporation of borax may lead to the formation of boron-containing minerals and structural changes, which exhibit superior hardness when compared to calcite alone. These additives may also be responsible for the modulation of pH during the carbonation process. Moreover, combinations of additives described herein were found to be compatible and can lead to further enhancement of the performance of the carbonated steel slag concrete, particularly the combination of borax and calcium carbonate and the combination of chloride and ammonium chloride.

The inclusion of borax may also impart a certain degree of corrosion resistance to metal implants such as steel reinforcements, rebar, and metal staples. It is also believed that organic acids such as citric acid can provide surface hardening and thus abrasion resistance in the final products. Therefore, such additives may be of significant value to concrete products produced using the current methodology. Boron or aluminum containing materials exhibit superior hardness compared to calcite alone.

The additives can also act as pH modulators by maintaining an alkaline pH to enhance carbon dioxide dissolution and carbonate ion generation. This would lead to the precipitation of stable calcium carbonate which reacts with $Ca^{2+}$ ions leached from the steel slag. The additives can also be considered as calcium leaching agents because the additives can form reactive intermediate complexes of calcium in reaction with calcium silicate minerals present in the steel slag. The reaction further proceeds with carbon dioxide to form calcium carbonate. As a result more $Ca^{2+}$ ions become available in the steel slag.

Moreover, limestone influences the properties of steel slag concrete through filler, nucleation, and chemical effects. The filler effect of limestone powder refines the microstructure and reduces porosity. The nucleation effect accelerates the carbonation of $C_2S$ and other reactive silicates, hydroxides, and oxides of Ca/Mg, leading to increased carbonation product ($CaCO_3$) formation and reduced porosity. The chemical effect promotes the precipitation of calcium carbonate.

The performance enhancement of carbonated precast concrete using additives is believed to be the result of the generation of extended networks of crystal lattices of calcium and/or magnesium carbonates across the medium (made of, but not limited to, slag and aggregate and/or residual water) in the carbonated concrete. In other words, more crystalized calcium and/or magnesium carbonates are generated inside carbonated precast concrete. This is achieved via a combination of pH modulation, enhanced calcium and/or magnesium leaching into the pore solution, enhanced precipitation of calcium and/or magnesium carbonates, and structural modification of the precipitated carbonates at the molecular level. This contributes to an enhanced $CO_2$ uptake which directly impacts the enhanced mechanical and durability properties. Furthermore, some of the uncarbonated dissolved calcium silicates may undergo reactions with the additives under the reaction conditions employed, which contributes to the strength development of carbonated precast concrete.

The $CO_2$ uptake is defined as a mass gain during the curing of the composition and attributed to a mass of carbon dioxide absorbed by the composition during the curing.

There are many advantages for the additives of the present disclosure. In some embodiments, the additive can result in an improvement of carbon dioxide uptake when compared to controls wherein no additives are included. In some embodiments, the additive can result in an improvement of mechanical and durability performance of the cured concrete products in terms of compressive strength and other performances, when compared to controls wherein no additives are included. In some embodiments, the additive can result in an improvement of freeze-thaw resistance of the cured concrete products, when compared to controls wherein no additives are included. In some embodiments, the additive can result in an improvement of abrasion resistance of the cured concrete products, when compared to controls wherein no additives are included. In some embodiments, the additive can result in an improvement of drying shrinkage of the cured concrete products, when compared to controls wherein no additives are included. In some embodiments, including hydrophobic additives such as limestone lead to a reduction in conditioning time, when compared to controls wherein no additives are included. In some embodiments, the additive allow minerals selected from Ca, Mg, Si and B to be formed during the method described above.

Examples of concrete products which may be produced using the method described herein include, but are not limited to, concrete pipes, traffic barriers, walls including retaining walls, boxes including modular boxes, culverts, tiles, pavers, foundations, slabs including hollow core slabs, patio slabs, steps, curbs, concrete masonry units, beams, floors, retaining walls, columns, manholes, sewage pipes, railroad ties, and other precast concrete products.

Below are some examples with the purpose to demonstrate that desirable characteristics may be obtained by the inclusion of additives to the composition mixture for the production of carbonated slag concrete using the methods of the present disclosure.

EXAMPLES

Typical precast concrete samples were prepared with binder contents between 5-80% weight. In the Examples below, if the percentage of a component is simply indicated as "%" then it refers to weight percent with respect to the total weight unless indicated otherwise. The binder used was steel slag, more specifically ladle slag was used. It was refined to the required fineness before being used as a binder. It had a cumulative calcium silicate content of at least about 15%, a combined calcium oxide and magnesium oxide content of at least 20%, a calcium oxide content 0.6%, and a silicon dioxide content of at least about 2%. The normal weight aggregate used was a combination of crushed stone and sand with a moisture content and water absorption of 1.17% and 1.17%, respectively. Compressed $CO_2$ gas in cylinders with a purity up to 99.9% was used for carbonation curing at a gauge pressure between 0.1-50 psi. The curing may be performed in a substantially airtight enclosure. In the context of the present disclosure, "airtight" implies that there is little to no leakage of gas through the enclosure at a pressure differential the enclosure is subjected to.

The binder and aggregate were mixed together in a mixer for 5 minutes, with sufficient amount of tap water added during this period to obtain the required workability. The obtained concrete mixture was formed and consolidated under compaction and vibration to the desired density. After being demolded, precast concrete samples were conditioned with a fan blower to lose about 10-90% of their initial moisture content. After that, the conditioned precast concrete samples were loaded into a pressure chamber for accelerated carbonation curing. Adjusted to a pressure of 0.1-50 psi, carbon dioxide gas was introduced into the sealed pressure chamber. The duration of carbonation curing was maintained at 4-72 h. After carbonation curing, the comparison samples were assessed for their compressive strength, following ASTM C140 (Standard Test Methods for Sampling and Testing Concrete Masonry Units and Related Units). Control samples were prepared identically but without additives.

Figure 3:
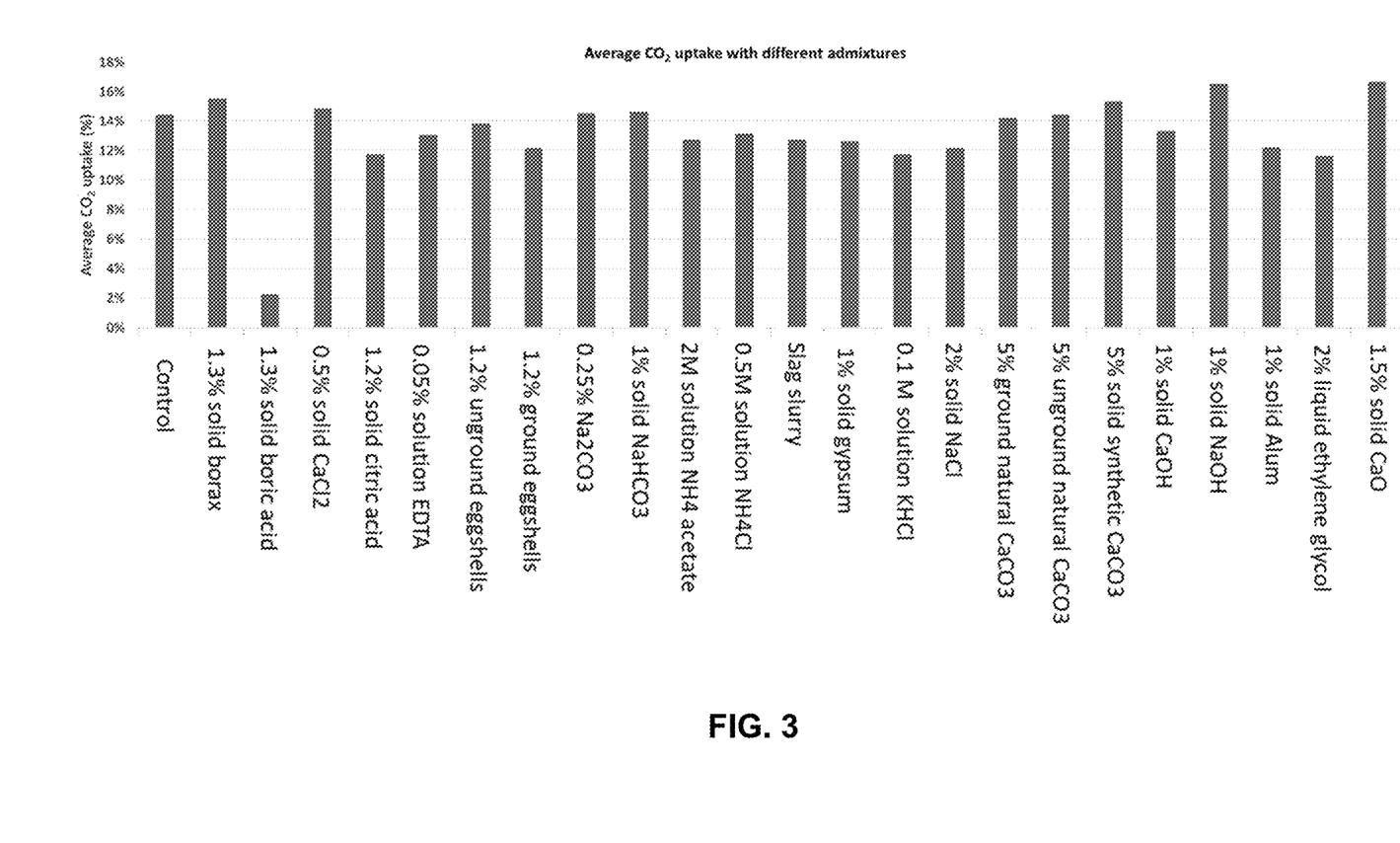
FIG. 3 is a bar graph showing the variation in $CO_2$ uptake in concrete samples observed with the use of different additives.
Figure 4:
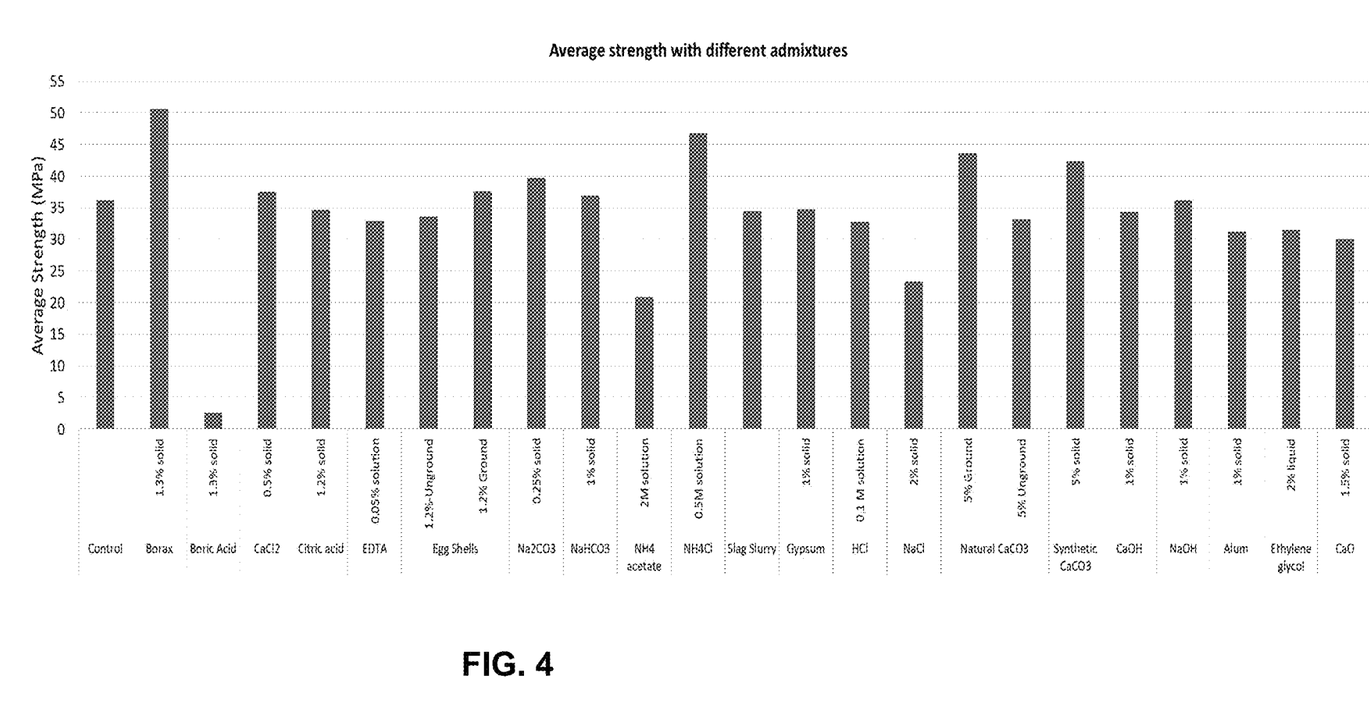
FIG. 4 is a bar graph showing the variation in compressive strength in concrete samples observed with the use of different additives.

For the additives: sodium carbonate, sodium bicarbonate, sodium hydroxide, calcium hydroxide (both as a chemical grade purity additive, as well as that derived from slag slurry), natural calcium carbonate (limestone, unground), eggshells (as a biomineral containing calcium carbonate), ethylene diamine tetraacetic acid (EDTA), calcium chloride, ammonium acetate, ethylene glycol, sodium chloride, boric acid, citric acid and commercial alum (potassium alumino sulfate) no improvement was observed relative to controls. The observed $CO_2$ uptake and compressive strengths using the additives are illustrated in FIGS. 3 and 4, respectively, as well as in Table 1.

The $CO_2$ uptake was measured by determining the mass difference before and after carbonation. The mass difference together with water evaporated from the exothermic carbonation reaction represents the mass gain due to carbon dioxide uptake. The carbonation reaction is exothermic in nature, and as a result some of the mixing water in the samples evaporates and condenses on the inner walls of the curing chamber. This water is collected and added to the mass of the carbonated sample since the water present in the chamber is part of the water in the original binder mass.

Example 1—Preparation of Carbonated Precast Concrete Made with Different Additives

TABLE 1

Average strength and $CO_2$ uptake for different additives tested at different conditions

| Additive | Concentration of additive | Strength (MPa) | Strength change | $CO_2$ uptake | $CO_2$ uptake change |
|---|---|---|---|---|---|
| Control (no additive) | | 36.1 | | 14.4% | |
| Boric acid ($BO_3H_3$) | 1.3% solid | 2.5 | −93% | 2.2% | −85% |
| Calcium chloride ($CaCl_2$) | 0.5% solid | 37.4 | 4% | 14.8% | 3% |
| Citric acid ($C_6H_8O_7$) | 1.2% solid | 34.6 | −4% | 11.7% | −19% |
| Ethylene diamine tetracetic acid (EDTA) | 0.05% solution | 32.8 | −9% | 13.0% | −10% |
| Eggshells | 1.2% unground | 33.5 | −7% | 13.8% | −4% |
| | 1.2% ground | 37.5 | 4% | 12.1% | −16% |
| Sodium Carbonate ($Na_2CO_3$) | 0.25% solid | 39.6 | 10% | 14.5% | 1% |
| Sodium bicarbonate ($NaHCO_3$) | 1% solid | 36.8 | 2% | 14.6% | 1% |
| Ammonium acetate ($NH_4CH_3CO_2$) | 2M solution | 20.8 | −42% | 12.7% | −12% |
| Slag Slurry | | 34.4 | −5% | 12.7% | −12% |
| Gypsum ($CaSO_4 \cdot 2H_2O$) | 1% solid | 34.7 | −4% | 12.6% | −13% |
| Hydrochloric acid (HCl) | 0.1M solution | 32.7 | −9% | 11.7% | −19% |
| Sodium chloride (NaCl) | 2% solid | 23.3 | −35% | 12.1% | −16% |
| Natural calcium carbonate (unground, $CaCO_3$) | 5% solid | 33.1 | −8% | 14.4% | 0% |
| Calcium hydroxide (CaOH) | 1% solid | 34.3 | −5% | 13.3% | −8% |
| Sodium hydroxide (NaOH) | 1% solid | 36.1 | 0% | 16.5% | 15% |
| Alum ($KAl_2 \cdot 12\ H_2O$) | 1% solid | 31.1 | −14% | 12.2% | −15% |
| Ethylene glycol $(CH_2OH)_2$ | 2% liquid | 31.4 | −13% | 11.6% | −19% |

For the additives: borax, ammonium chloride, calcium oxide, and calcium carbonate (synthetic and natural), performance increase was observed as detailed in Table 2.

Example 2—Preparation of Carbonated Precast Concrete Made with Different Additives

TABLE 2

Sample Testing Results

| | | | | Testing results | | | | |
|---|---|---|---|---|---|---|---|---|
| Additive | Concentration (% total weight) | Method of addition | Conditioning time | $CO_2$ uptake(%) | $CO_2$ uptake change | Cured density (kg/m$^3$) | Strength (MPa) | Strength change |
| No additive | — | | ~3 h | 14.4 | — | 2352 | 36.1 | — |
| Ammonium Chloride | 0.2 | As an aqueous solution | ~6 h | 13.1 | −9% | 2364 | 46.7 | +29% |
| Borax (solid) | 1.3 | As a solid | ~4 h | 15.7 | 9% | 2278 | 50.5 | +39% |
| Synthetic Calcium Carbonate | 5 | As a solid | 2-3 h | 15.3 | 6% | 2341 | 42.3 | +17% |

TABLE 2-continued

Sample Testing Results

| Additive | Concentration (% total weight) | Method of addition | Conditioning time | CO$_2$ uptake(%) | CO$_2$ uptake change | Cured density (kg/m$^3$) | Strength (MPa) | Strength change |
|---|---|---|---|---|---|---|---|---|
| Natural Calcium Carbonate | 5 | As a solid | 2-3 h | 14.4 | 0% | 2292 | 33.1 | −8% |
| Natural Calcium Carbonate (ground) | 5 | As a solid | 2-3 h | 14.5 | 0% | 2326 | 43.5 | +20% |
| Calcium Oxide | 1 | As a solid | 2-3 h | 17.4 | 21% | 2218 | 33.3 | −8% |

Note:
selected based on target cured densities (~2300 kg/m$^3$) within a range of ±5% of that of controls The additives, namely ammonium chloride, borax, calcium oxide, and calcium carbonate resulted in a significant improvement in CO$_2$ uptake and/or compressive strengths.

As an exemplary demonstration, ammonium chloride (used as a 0.5 M solution) resulted in a CO$_2$ uptake of 13.1%, as well as an increase in compressive strength to 46.7 MPa, corresponding to an overall increase of 29% is being demonstrated.

As another exemplary demonstration, borax (1.3% by weight of total mix) resulted in CO$_2$ uptake of 15.7% corresponding to an overall improvement of 9% relative to controls. A vast improvement in the compressive strength to 50.5 MPa is being demonstrated which corresponds to an overall increase of 39%.

As another exemplary demonstration, synthetic calcium carbonate (5% by weight of total mix) resulted in CO$_2$ uptake of 15.3% corresponding to an increase of 6%. A modest improvement in strength to 42.3 MPa is being demonstrated.

As another exemplary demonstration, natural calcium carbonate (limestone) (used as received at 5% by weight of total mix 3) resulted in diminished CO$_2$ uptake and correspondingly reduced compressive strengths.

In contrast, a significant improvement (43.5 MPa, 20% improvement relative to controls) in strength was observed with ground natural limestone (5% by weight of total mix) without a compromise in densities or CO$_2$-uptake.

As another exemplary demonstration, calcium oxide (used as received at 1.5% by weight of total mix) resulted in an increase of 21% CO$_2$ uptake. However, no improvement in concrete product performance was observed.

Addition of additives can impact the conditioning time required for reaching secondary water-to-binder ratios. In the case of hydrophilic additives such as ammonium chloride and borax, an increase in drying time was observed, while for a hydrophobic additive like calcium carbonate, regardless of whether improvement of performance was observed, decreased required conditioning time. The reduction of conditioning time with the addition of calcium carbonate to compensate for the increased drying time observed for hygroscopic additives such as ammonium chloride and borax is lucrative from a production and turnover time point of view.

Example 3—Preparation of Carbonated Precast Concrete with Borax in Conjunction with Synthetic Calcium Carbonate and/or Ammonium Chloride

TABLE 3

Sample testing results for the combination of additives

| Additive Combination | Method of addition | Conditioning time | CO$_2$ uptake | CO$_2$ uptake change | Cured Density (kg/m$^3$) | Strength (MPa) | Strength change |
|---|---|---|---|---|---|---|---|
| Borax (2%) + Synthetic Calcium Carbonate (2%) | Premix as solids | ~3 h | 13.9 | −3% | 2315 | 44.7 | +24% |
| Borax (2%) + Synthetic Calcium Carbonate (5%) | Premix as solids | ~3 h | 14.5 | +0.7% | 2228 | 39.2 | +8.5% |
| Borax solution (0.1M) + Ammonium Chloride (2M) | As an aqueous solution | ~12 h | 15.3 | +6% | 2366 | 40.2 | +11% |

Note:
selected based on target cured densities (~2300 kg/m$^3$) within a range of ±5% of that of controls; changes assessed relative to the controls (Table 1)

The combination of synthetic calcium carbonate, while reducing drying time did not demonstrate a significant detriment of performance. It can be presumed that in addition to the role of synthetic calcium carbonate as a precipitation enhancer, it enhances the drying rate owing to its microfine (yet, hydrophobic) character.

As an exemplary demonstration, synthetic calcium carbonate (2% by weight of total mix), added together with borax (2% of the total mix) reduced drying time to ~3 h. While a negligible reduction in $CO_2$ uptake was observed, the sample demonstrated a compressive strength of 44.7 MPa, corresponding to a 24% increase (when compared to controls).

As another demonstration, increasing the dosage of fine calcium carbonate to 5% resulted in a slight increase of $CO_2$ uptake, albeit at slightly reduced densities but still improved compressive strengths (39.2 MPa, which is 8.5% higher than that of controls).

A further demonstration that a combination of additives can be compatible was observed for the combination of borax and ammonium chloride. As an alternate method of addition, solutions of borax and ammonium chloride in water added to the mix resulted in a $CO_2$ uptake of 15.3% (corresponding to an improvement by 6% relative to controls). Resultant compressive strengths of 40.2 MPa were found to be appreciably high, which corresponds to an overall increase of 11% relative to controls.

Typically, a reduction of the percentage of binder (including but not limited to slag) leads to lowering of strengths and performance. As another demonstration that the addition of borax can compensate for the decrease in strength upon lowering of slag content, samples were cast with and without borax at different slag contents referred as 1, 2, and 3. At comparable densities, in all cases, significant boosts in compressive strengths were observed where borax was used, as tabulated in Table 4, together with the increase in $CO_2$-uptake. In the case of slag content 1, $CO_2$ uptake and strengths increased by 19.5% and 72%, respectively. In the case of slag content 2, $CO_2$ uptake and strengths increased by 9.5% and 53%, respectively, without corresponding significant changes in densities. In the case of composition with slag content 3, $CO_2$-uptake and strengths increased by 12.6% and 53%, respectively, without significant change in densities.

Example 4—Testing Slag Contents

TABLE 4

Sample Testing Results for samples prepared with other slag content referred as 1, 2 and 3 content, without additives and with borax, ammonium chloride, synthetic calcium carbonate, and natural calcium carbonate (ground)

| Additive (%) | Slag content | Method of addition | Testing results ||||
|---|---|---|---|---|---|---|
| | | | $CO_2$ uptake (%) | $CO_2$ uptake change | Cured Density (kg/m³) | Strength (MPa) | Strength change* (%) |
| No additive | 1 | — | 11.7 | — | 2083 | 9.0 | — |
| | 2 | | 13.6 | — | 2233 | 21.3 | — |
| | 3 | | 13.5 | — | 2355 | 30.1 | — |
| Borax (1.3%) | 1 | As a solid | 14.0 | +20% | 2090 | 15.6 | +73% |
| | 2 | | 14.9 | +10% | 2241 | 32.7 | +54% |
| | 3 | | 15.2 | +13% | 2324 | 46.1 | +53% |
| Ammonium chloride (0.5M) | 1 | As an aqueous solution | 12.3 | +5% | 2100 | 12.6 | +40% |
| | 2 | | 13.6 | 0% | 2285 | 30.5 | +43% |
| | 3 | | 14.1 | +4% | 2341 | 37.2 | +24% |
| Synthetic calcium carbonate (5%) | 1 | As a solid | 15.3 | +31% | 2106 | 8.1 | −10% |
| | 2 | | 15.1 | +11% | 2214 | 21.2 | 0% |
| | 3 | | 15.3 | +13% | 2361 | 40.2 | +34% |
| Natural calcium carbonate (ground) (5%) | 1 | As a solid | 14.6 | +25% | 2109 | 8.3 | −8% |
| | 2 | | 15.0 | +10% | 2223 | 21.2 | 0% |
| | 3 | | 14.7 | +9% | 2325 | 39.8 | +32% |

*Strength change relative to controls with the same binder content

Example 5—Testing Other Type of Slags

More samples were prepared using slags from different sources such as blast oxygen furnace (BOF) slag, Linz-Donawitz (LD) slag, and ladle slag to validate improvement with borax. Control samples without additives demonstrated $CO_2$ uptake of 14.1% and a baseline strength of 29.0 MPa. By method of 304, the addition of borax resulted in a significant improvement of $CO_2$-uptake to 17.4% and a corresponding improvement of strength 45.2 MPa (which is an improvement of 56% relative to controls).

TABLE 5

Sample Testing Results for Linz-Donawitz slag

| Additive (%) | Concentration (% total weight) | Method of addition | Testing results | | | | |
|---|---|---|---|---|---|---|---|
| | | | $CO_2$ uptake (%) | $CO_2$ uptake change (%) | Density ($kg/m^3$) | Strength (MPa) | Strength change |
| No additive | — | — | 14.1 | — | 2409 | 29.0 | — |
| Borax (solution) | 0.3 | As an aqueous solution | 17.4 | 23% | 2390 | 45.2 | 56% |

Example 6—Testing Other Slags and Combination of Other Aggregates

More samples were prepared using different river sand fine aggregates to rule out dependency on aggregates source and grade. An improvement of 7% in $CO_2$ uptake and a 20% improvement in compressive strengths were observed.

TABLE 6

Sample Testing Results for Ladle slag with Bellemare fine sand aggregate

| Additive (%) | Concentration (% total weight) | Method of addition | Testing results | | | | |
|---|---|---|---|---|---|---|---|
| | | | $CO_2$ uptake (%) | $CO_2$ uptake change (%) | Density ($kg/m^3$) | Strength (MPa) | Strength change |
| No additive | — | — | 13.0 | — | 2250 | 27.0 | — |
| Borax (solid) | | As a solid | 14.0 | +7% | 2175 | 32.4 | +20% |

Notes:
changes assessed relative to the controls (Table 6, row 1)

Example 7—Durability Properties

Figure 5:
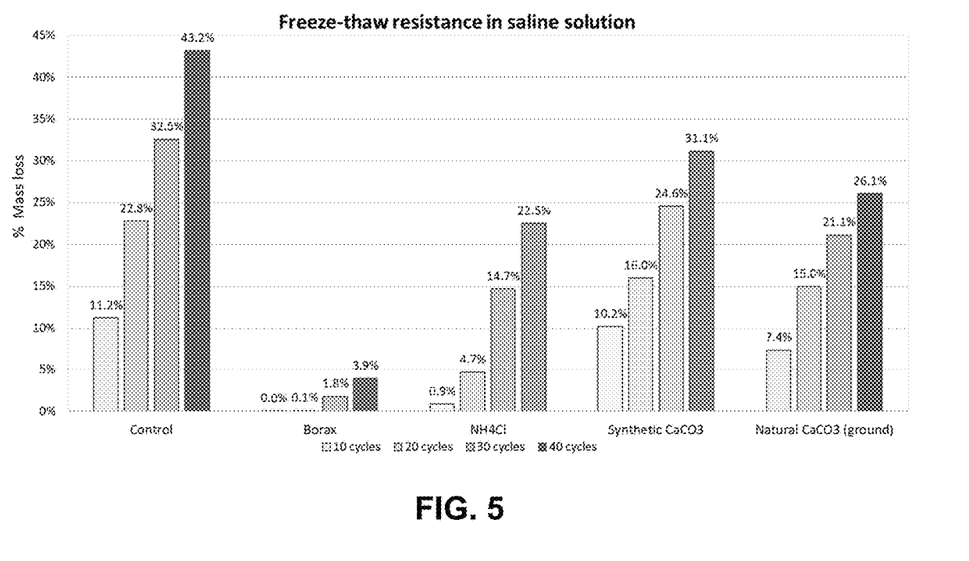
FIG. 5 is a graph showing the freeze-thaw resistance in concrete samples prepared with borax, ammonium chloride, and two different types of calcium carbonate as an additive relative to controls where no additive was used (for each condition from left to right: 10 cycles, 20 cycles, 30 cycles and 40 cycles).

As another demonstration, significant improvement of durability properties such as freeze-thaw resistance was observed with samples prepared with borax and ammonium chloride as additives. Referring to FIG. 5, in saline solution, over the course of 10, 20, 30, and 40 cycles, a control sample underwent 11.2%, 22.8%, 32.5%, and 43.2% mass loss. In contrast, a sample prepared with 1.3% borax as additive underwent 0.03%, 0.10%, 1.8% and 3.9% mass loss. Likewise, a sample prepared with a solution of 0.5 M of ammonium chloride, underwent 0.9%, 4.7%, 14.7% and 22.5% of mass loss After 40 cycles, this data represents an improvement of 91% in reduction of mass loss with the use of borax and 48% in the case of ammonium chloride.

Figure 6:
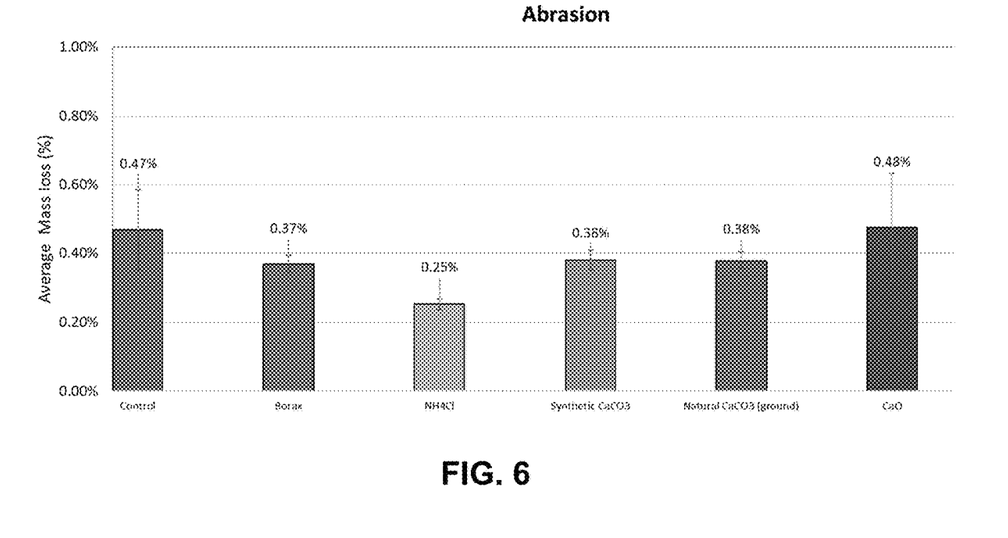
FIG. 6 is a graph showing the abrasion resistance in concrete samples prepared with borax, ammonium chloride, two different types of calcium carbonate, and calcium oxide as an additive relative to a control where no additive was used.

Abrasion results present another demonstration of significant improvement of durability properties with the samples prepared with borax, ammonium chloride, and both of the two types of calcium carbonate as additives. Referring to FIG. 6, the samples were tested for abrasion resistance, whereas the control samples lost an average of 0.47%, the samples prepared with calcium carbonate showed a mass loss of 0.38%, this represents an improvement of 19% in mass loss. Likewise, the samples prepared with borax showed a mass loss of 0.37% and the samples prepared with a solution of 0.5 M of ammonium chloride showed an average mass loss of 0.25%. The latest represents an improvement of 21% and 47% in the reduction of mass loss, respectively. In the case of calcium oxide, the results are equivalent to the control samples.

Figure 7:
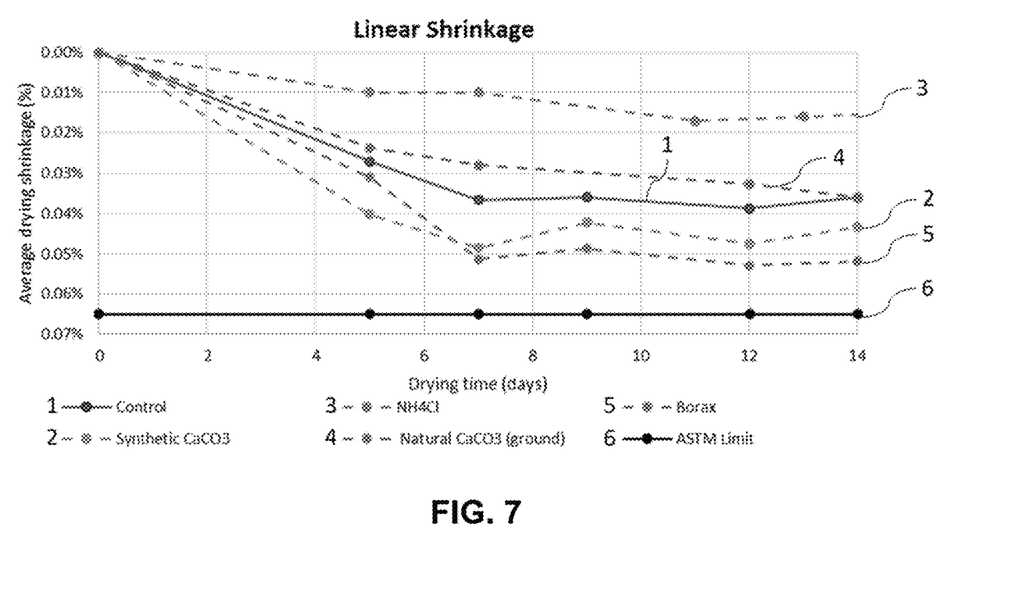
FIG. 7 is a graph showing the drying shrinkage in function of time for concrete samples prepared with borax, ammonium chloride, and two different types of calcium carbonate as an additive relative to controls where no additive was used.

As another demonstration, drying shrinkage results present another demonstration of improvement of durability properties for the samples prepared with ammonium chloride. Referring to FIG. 7 and Table 7, the samples were tested for drying shrinkage, whereas the control samples achieved a final drying shrinkage of 0.036% after 14 days, the samples prepared with a solution of 0.5 M of ammonium chloride showed an average drying shrinkage of 0.013%. In the case of samples prepared with natural calcium carbonate, the final drying shrinkage was equivalent to the control samples, with a final value of 0.037%. In the case of borax and synthetic calcium carbonate, no improvement was observed, with final average values of 0.052% and 0.043% respectively.

TABLE 7

Sample testing results with different additives for average drying shrinkage

| Additive | Method of addition | Average drying shrinkage after 14 days (%) |
|---|---|---|
| No additive | — | 0.036 |
| Borax (1.3%) | As a solid | 0.052 |
| Ammonium Chloride (0.5M) | As an aqueous solution | 0.013 |
| Synthetic calcium carbonate (5%) | As a solid | 0.043 |
| Natural calcium carbonate ground (5%) | As a solid | 0.037 |
| Calcium Oxide (1.5%) | As a solid | |

In the context of the present disclosure, the expression "about" implies variations of plus or minus 10%.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

What is claimed is:

1. A method of manufacturing a concrete product, comprising:
   mixing a composition including a slag-based binder, an aggregate, water and an additive selected from the group consisting of calcium chloride, ground eggshells, sodium carbonate, sodium bicarbonate, sodium hydroxide, fine calcium carbonate, calcium oxide, borax, ammonium chloride and combinations thereof, to obtain a concrete mixture;
   forming the concrete mixture into a desired shape to obtain a formed concrete, the formed concrete having a first water-to-binder ratio;
   drying the formed concrete to obtain a dried concrete having a second water-to-binder ratio less than the first water-to-binder ratio; and
   carbon curing the concrete mixture to obtain the concrete product.

2. The method of claim 1, wherein the additive is provided in solid or soluble form.

3. The method of claim 2, wherein the soluble form of the additive is dissolved in the water.

4. The method of claim 3, wherein the additive is present in a concentration of from 0.25 to 5 M in the water.

5. The method of claim 1, wherein the additive is added in a concentration of 0.3 to 5% by weight with respect to the total weight of the composition.

6. The method of claim 1, wherein the additive is selected from the group consisting of ground calcium carbonate, ammonium chloride, calcium oxide, borax and combinations thereof.

7. The method of claim 1, wherein the additive is selected from (i) the combination of borax and calcium carbonate, or (ii) the combination of borax and ammonium chloride.

8. The method of claim 1, wherein the forming comprises molding the concrete mixture.

9. The method of claim 8, further comprising demolding the formed concrete.

10. The method of claim 9, wherein the demolding step overlaps or is simultaneous with the drying.

11. The method of claim 1, wherein the forming comprises dry casting the concrete mixture in a mold to obtain a molded concrete.

12. The method of claim 1, wherein the concrete mixture has a slump zero or close to zero.

13. The method of claim 1, wherein the first water-to-binder ratio is reduced by up to 90% to obtain the second water-to-binder ratio.

14. The method of claim 1, wherein the curing is performed with $CO_2$ gas at a concentration of at least 5% by volume and at a pressure of 0.1-50 psi for 1-72 hours.

15. The method of claim 1, further comprising before the step of mixing, grinding the additive with the slag binder.

16. The method of claim 1, wherein the concrete mixture that is subjected to the curing step has an alkaline pH.

17. The method of claim 1, wherein the slag binder comprises a slag selected from a steel slag, a stainless-steel slag, a basic oxygen converter sludge, a blast furnace sludge, a slag by-product of zinc production, a slag by-product of iron production, and/or a slag by-product of copper production.

18. The method of claim 1, wherein the concrete product is selected from a pipes, a traffic barrier, a wall, a box, a culvert, a tiles, a paver, a foundation, a slab, a step, a curb, a concrete masonry unit, a beam, a floor, a retaining wall, a column, a manhole, a sewage pipes, or a railroad tie.

19. A method of manufacturing a concrete product, comprising:
   mixing a composition including a slag-based binder, an aggregate, water and an additive selected from the group consisting of calcium chloride, ground eggshells, sodium carbonate, sodium bicarbonate, sodium hydroxide, fine calcium carbonate, calcium oxide, borax, ammonium chloride and combinations thereof, to obtain a concrete mixture;
   molding the concrete mixture into a desired shape;
   demolding the concrete mixture to form a molded intermediate having a first water-to-binder ratio;
   drying the molded intermediate to obtain a dried concrete having a second water-to-binder ratio less than the first water-to-binder ratio; and
   carbon curing the concrete mixture to obtain the concrete product.

20. The method of claim 19, wherein said drying and said carbon curing are performed at least partially at the same time.

* * * * *